March 3, 1959 — F. K. KUGEL — 2,875,581
HYDRAULIC COUPLING

Filed May 19, 1955 — 2 Sheets-Sheet 1

INVENTOR:
Fritz K. Kugel

March 3, 1959

F. K. KUGEL 2,875,581

HYDRAULIC COUPLING

Filed May 19, 1955

INVENTOR:
Fritz K. Kugel
By
Patent Agent

United States Patent Office 2,875,581
Patented Mar. 3, 1959

2,875,581

HYDRAULIC COUPLING

Fritz K. Kugel, Heidenheim (Brenz), Germany, assignor to J. M. Voith, G. m. b. H., Maschinenfabrik, Heidenheim, Brenz, Germany Application May 19, 1955, Serial No. 509,620
In Germany October 1, 1948

Public Law 619, August 23, 1954
Patent expires October 1, 1968

20 Claims. (Cl. 60—54)

The present invention relates to hydrodynamic couplings, generally called hydraulic couplings, with rotating containers and is of particular advantage in connection with power transmission systems employing a short-circuit rotor motor, and is also of particular advantage in connection with vehicle drives comprising internal combustion engines.

In power transmission systems comprising a hydraulic coupling, especially when the drive is effected by an internal combustion engine or an electric motor operating with a short-circuit rotor, it is desirable within the normal working range to have minimum slip and thus to obtain a maximum efficiency in the hydraulic coupling, and to have a minimum torque transmission when the slip is high. Thus, for example, in a vehicle transmission gear, the torque transmitted by the coupling when the motor is idling should be so small that the stationary vehicle will not tend to move. This problem is particularly acute with couplings having a constant fluid filling, that is to say those couplings in which no externally operated means are provided for regulating the filling.

It is, therefore, an object of this invention to provide a hydraulic coupling arrangement in which the torque adapted to be transmitted will with maximum slip up to the point where the driven shaft is completely braked (100% slip) amount to only 1.5 to 3 times the normal torque transmitted with a slip of 2 to 3%.

A further frequently undesired feature of heretofore known hydraulic couplings with constant filling consists in that when directly throwing in the drive motor, it is unavoidable that due to high torques transmitted by the coupling, shock-like acting loads will occur in the drive system. Thus, for instance, when employing a drive with a short-circuit rotor motor the latter when switched on causes a strong current surge or with long feeding lines causes a great drop in voltage and thereby a drop in the motor torque.

Therefore, it is another object of this invention to provide a hydraulic coupling arrangement in which the power transmission ability of the hydraulic coupling during the starting operation is reduced with regard to that of ordinary coupling designs.

These and other objects and advantages of the invention will appear more clearly from the following specification in connection with the accompanying drawings in which.

General arrangement

According to the invention the turbine wheel blading of the hydraulic coupling is provided with a smaller inner diameter than the impeller blading. Furthermore the radially inner portion of the blade chamber of the turbine wheel communicates with a rotatable container located radially within the inner diameter of the impeller blading. The said rotatable container will henceforth be called first rotatable container or accumulating chamber. The hydraulic coupling according to the invention furthermore comprises a further container rotating with the impeller and henceforth called second rotatable container. This second rotatable container is intended and designed to receive a portion of the coupling liquid. The space of said second rotatable container is located substantially inside a diameter which about corresponds to the medium diameter of the impeller blading. The second rotatable container communicates through openings at its maximum diameter with the blade chamber of the impeller. The arrangement of the second rotatable container is such that during the standstill of the hydraulic coupling, the working chamber thereof partly discharges into the second container, whereas said second container during the starting period due to centrifugal force gradually discharges into the working circuit.

Figure 1:
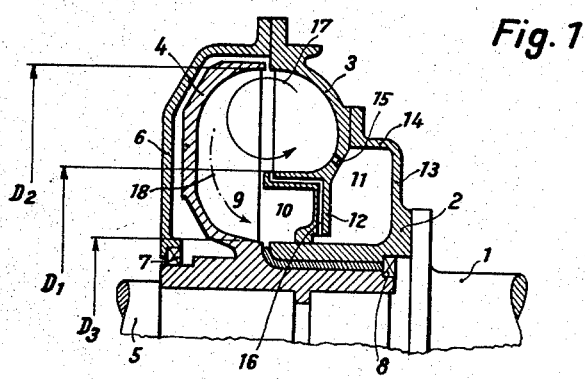
Fig. 1 illustrates a longitudinal section through a hydraulic coupling provided with coupling bladings and two rotating containers in conformity with the present invention.

In such a hydraulic coupling, at normally low slip, for instance 3%, the flow in the coupling working chamber is substantially unaffected because the vortex flow due to the high primary and secondary speed of rotation takes place in the radially outer portions of the working chamber as is indicated by the arrow 17 in Fig. 1. At high slip, however, the flow in the turbine wheel takes place further radially inwardly and in the first rotating container or accumulator chamber due to the low turbine wheel speed. As a result thereof, the vortex flow in the coupling working chamber is disturbed and furthermore a portion of the working fluid accumulates in the accumulator chamber and is withdrawn from the working circuit so that, therefore, at high slip the transmission capacity of the coupling is essentially reduced over that of ordinary couplings.

When the hydraulic coupling is at a standstill, a portion of the coupling fluid will always collect in the second container. This portion of the liquid remains during a sudden start temporarily in said second container and only gradually is thrown out therefrom by centrifugal force into the coupling working chamber through the discharge openings arranged along a large diameter. Thus, during the starting period the working chamber is only partially filled and the torque conveyed by the coupling is, as desired, considerably reduced.

Structural arrangement

Referring now to the drawings in detail and Fig. 1 thereof in particular, the arrangement shown in Fig. 1 comprises a driving shaft 1 having flanged thereto a disc 2 which carries the impeller 3. The turbine wheel 4 is mounted on the driven shaft 5 and is enclosed by the casing 6 connected to the impeller 3. Sealings or gaskets 7 and 8 seal the coupling toward the outside and prevent the coupling fluid from escaping. The inner diameter D3 of the turbine blading is smaller than the inner diameter D1 of the impeller blading. The radially innermost portion 9 of the turbine wheel chamber directly communicates with a first container 10 also called the accumulator chamber. The container 10 or accumulator chamber is located within the inner diameter D1 of the pump wheel blading and the walls thereof rotate, and more specifically, in this instance rotate together with the impeller. In addition to the accumulator chamber 10 there is also provided a second container 11 formed by the walls 12, 13 and 14 rotating together with the impeller. The chamber of said second container 11 is located within the medium diameter of the impeller blading. The said chamber of container 11 communicates with the working chamber of the hydraulic coupling through passages 15 along the greatest diameter. The wall 12 rotating with the impeller is furthermore provided with vents or passages 16 which extend from the entrance edge of the impeller blading up to approximately the middle of the container 11. The purpose of these vents consists in allowing an air exchange between the working chamber of the coupling and the container 11, and also facilitates the filling and discharging of this container 11. If desired, the vents may consist of separate tubes not shown in the drawing which pass from the medium range (core chamber) of the working chamber of the coupling into the central portion of the container 11.

*Operation*

The impeller rotates at high speed and imparts the known vortex ring motion upon the coupling fluid, at which motion the fluid within the impeller blading flows outwardly, then impinges upon the turbine blading, and between the latter is deflected inwardly. At low slip values, i. e. when impeller and turbine wheel have approximately the same speed of rotation, the vortex ring is due to the high centrifugal force, also prevalent in the turbine wheel, located far outwardly as indicated by the arrow 17 so that the deviation from the turbine wheel into the impeller is effected entirely or principally outside the diameter D1 while the radially inner portion 9 of the turbine blading remains substantially untouched by the flow. At low slip, i. e. within the normal working range, the power transmission is effected at low losses.

Figure 2:
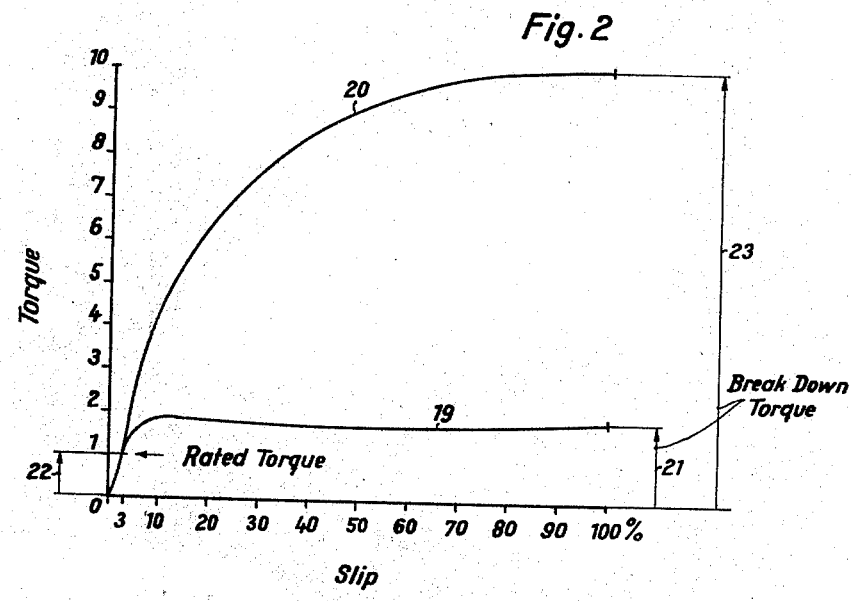
Fig. 2 shows two graphs illustrating the respective torque curves of a hydraulic coupling according to the invention and of an ordinary hydraulic coupling.

At high coupling slip, however, the fluid in the turbine wheel is due to the low secondary speed and therefore low centrifugal force passed far radially inwardly according to the arrow 18 and partly into the accumulator chamber 10 representing the first rotating container whereby the vortex flow is greatly braked and additionally the working chamber of the coupling is at least partly emptied whereby the transmitted torque is reduced in the desired manner. As soon as the slip again drops to its normal low value, at which the impeller and turbine wheel rotate again at about equal speed, also the vortex flow occurs again in an undisturbed manner in conformity with the arrow 17. The fluid in the accumulator chamber 10 will then be thrown outwardly by centrifugal force into the working chamber which latter is thus filled again to the normal extent. The advantageous effect of the accumulator chamber is particularly clearly shown by the graphs of Fig. 2. The curve 19 of Fig. 2 pertains to a coupling according to the invention and illustrates the course of the torque conveyed by the coupling over the slip of the coupling. For purposes of comparison, also the slip-torque curve 20 of a normal hydraulic coupling with the same outer diameter has been shown. Within the main working range, i. e. at low slippage, the two curves coincide. However, with increasing slip, the curve 20 of the ordinary hydraulic coupling increases up to a multiple, sometimes ten to twenty-fold, of the normal torque transmitted at a slip of about 3%. In contrast thereto, the curve 19 rather sharply bends and remains at the same level at a slip of 10% up to a slip of 100%. The so-called breakdown torque with the coupling according to the invention is only twice (value 21) the normal torque 22 whereas with an ordinary coupling the breakdown torque 23 is about ten times the normal torque 22. Depending on the dimensions of the inner diameter of the impeller and turbine wheel and the size of the accumulator chamber 10, the characteristics of the hydraulic coupling can be adapted to the respective required conditions. In this way, also other multiples for the breakdown torque can be obtained with regard to the normal coupling torque. Furthermore, by correspondingly selecting the quantity of the coupling fluid, the desired effect can be influenced.

The second rotating container 11 becomes effective during the standstill only of the hydraulic coupling. In this instance the coupling fluid collects in the lower portion of the working chamber (blading chamber) and of the container 11. If then the drive motor is made effective and suddenly rotates the impeller, only a portion of the entire coupling fluid is available in the working chamber of the coupling for conveying the torque. In other words the fluid in the container 11 is missing in the working chamber of the coupling. Only gradually the fluid in container 11 is rotated by friction with the wall and by means of the centrifugal force gradually being built up is thrown into the working chamber of the coupling through the connecting passages 15. As a result of this arrangement, therefore, the torque transmitting capacity is shortly after the motor has been made effective only partially available and only gradually increases to its maximum value. In this way an overload of the drive during the starting period is avoided which overload may for instance cause current impulses or an undesired voltage drop when the drive is effected with short circuit rotor motors.

By correspondingly dimensioning the connecting passages between the container 11 and the blade chamber of the coupling, the time within which the fluid passes from said container 11 into the annular working chamber may be adjusted at random to adapt the coupling to the respective requirements.

Figure 3:
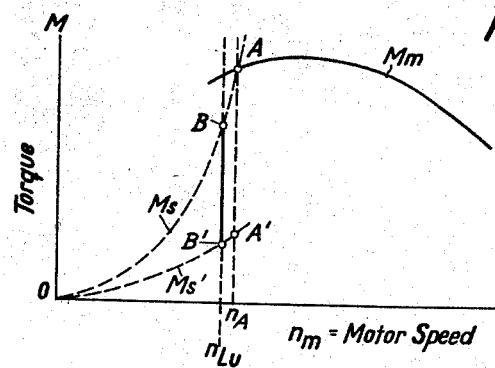
Fig. 3 shows graphs illustrating the motor torque as depending on the speed of the drive motor, and the torques respectively obtained during the starting period by a hydraulic coupling according to the invention and by an ordinary hydraulic coupling.

Fig. 3 shows by means of a graph the influence of the second rotating container 11. The motor torque at fully open throttle Mm is plotted over the motor speed nm. The transmittable hauling torque (torque with turbine wheel braked down) adapted to be transmitted by an ordinary hydraulic coupling, i. e. without rotating container, is represented by the parabola Ms which intersects the motor-torque curve Mm at point A at a speed nA. This means that with the vehicle at a standstill and at the fully open throttle torque, the motor speed is reduced to the speed nA. The lower idling speed of the motor designated as nLu will when employing a diesel engine be located only slightly below the value nA so that still a relatively high hauling torque corresponds to the value nLu which torque is characterized by the ordinate ending in the point B. A hydraulic coupling according to the present invention in which temporarily, namely within the speed range of from 0 to nA only a partial filling is effective yields a hauling torque curve according to the parabola Ms' and consequently a considerably lower hauling torque at the lower idling speed at point B'. Such feature of the hydraulic coupling is in addition to diesel engines also desirable with internal combustion engines and when the drive is effected by means of short circuit rotor motors. This will facilitate the starting of the motors and when an overload occurs will prevent too great a reduction in the speed of the motor for instance with short circuit rotor motors about below the pullout torque speed.

The ratio of the inner diameter D1 to the outer diameter D2 of the impeller blading is selected preferably greater than 0.4 (see Fig. 1). In this instance the design of the impeller blading chamber corresponds to the actual shape of the vortex ring as it is encountered during normal operation, i. e. low slip. The coupling will then particularly meet the requirement of a high degree of transmitting efficiency during normal operation. In this connection it is also advantageous to fill the coupling with a quantity of liquid which corresponds to twice the volume of the impeller blading chamber.

It is furthermore expedient to design the hydraulic coupling as known per se without core guide ring in order during the varying slip conditions to allow the displacement of the vortex flow without any disturbances. Additionally, a very high number of blades may be provided whereby the wall surface contacted by the fluid and, therefore, also the flow resistance at high slip will be increased. In this way, the effect intended with the coupling according to the invention is further aided.

The construction of the coupling according to the invention not only allows a considerable reduction in the filling of the coupling but also makes it possible that the fluid which heats up considerably during operation can expand sufficiently so that only a minor pressure will occur in the coupling which means that the coupling inner chamber can be sealed in a simple manner.

Figure 4:
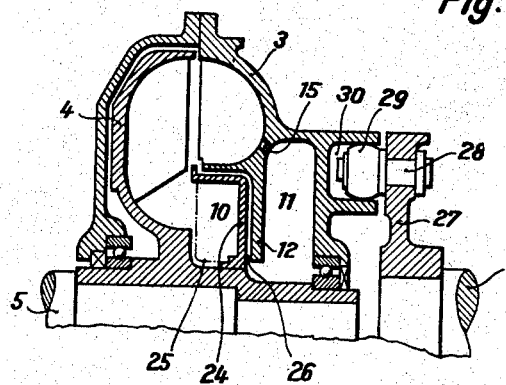
Fig. 4 is a longitudinal section through a hydraulic coupling similar to that of Fig. 1 but differing therefrom in that the turbine wheel is provided with walls by means of which the first rotatable container is screened with regard to the pump wheel or impeller.

The arrangement of the coupling shown in Fig. 4 corresponds substantially to that of Fig. 1 with the exception that the accumulator chamber 10 forming the first rotating container is shielded or screened with regard to the impeller 3 by a casing or cup-shaped member 24. In this way, the fluid in the accumllator chamber will, when the turbine wheel is at a standstill or is rotating slowly, be prevented from being taken along by the faster running impeller in which instance the fluid would be thrown back into the working chamber by the centrifugal force then prevailing. This arrangement therefore yields a further reduction in the transmitted torque and brings about a retardation in the time during which the torque transmitting capacity increases over the arrangement of a coupling according to Fig. 1. This effect can also be obtained or aided by individual blades 25 arranged in the accumulator chamber and connected to the turbine wheel. The accumulator chamber expands in axial direction by about the same amount as the blading chamber of the impeller 3. The air exchange conduit means for the chamber 11 is in this instance formed by the space 26 between the cup-shaped member 24 (which is connected to the turbine wheel and shields the accumulator 10 with regard to the impeller), and the wall 12 of the impeller.

The drive of the impeller 3 is effected by the motor shaft 1 through the intervention of an elastic clutch consisting of a flange 27 and bolts 28 with rubber sleeving 29 which latter is engaged by sockets 30 provided in the casing of the impeller.

Figure 5:
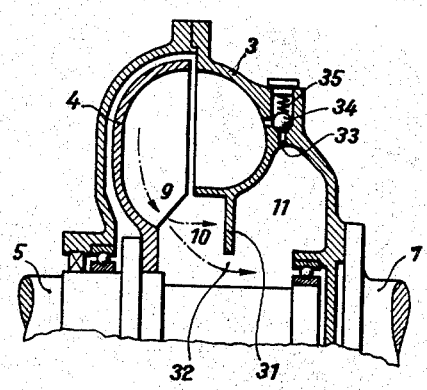
Fig. 5 is a hydraulic coupling with a direct connection between the two rotating containers and with centrifugally controlled discharge valves on the second container.

According to the coupling shown in Fig. 5, an annular passage 32 is provided between the wall 31 perpendicular to the axis of the coupling, and the coupling shaft 5. The accumulator chamber 10 and the container 11 permanently communicate with each other through said passage 32. The discharge opening 33 at the largest diameter of the container 11 is controlled by a spring loaded valve 34 which automatically opens at a certain impeller speed. The container 11 thus not only at a standstill of the coupling collects a portion of the coupling fluid, but also at high slip a portion of the fluid thrown into the chamber 10 will pass through passage 32 into the container 11. The fluid accumulated in the container 11 can, however, due to the centrifugal force and the wall 31 acting like a weir not return into the working chamber through chambers 10, 9 but can flow back into the working chamber only after a certain primary speed has been exceeded, namely when the springs 35 allow the valves 34 to open. In this way, from the start to a desired speed, a partial emptying of the coupling working chamber and a considerable reduction in the torque of the coupling is obtained. The valve control may, for instance, be adjusted so that the valve will remain closed from 0 speed up to the lower idling speed of the driving diesel engine but will open as soon as said last mentioned speed has been exceeded.

It is a matter of course that the control of the valves 34 is not limited to the manner in which it is effected according to Fig. 5 but may also be effected at random.

Figure 6:
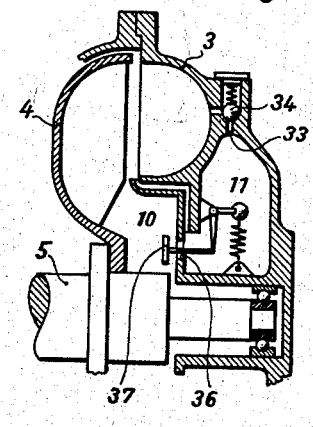
Fig. 6 is a hydraulic coupling similar to that of Fig. 5 but differing therefrom in that centrifugally controlled connecting passages are provided between the two containers.

Fig. 6 shows an arrangement in which also the connecting passages 36 between the accumulator chamber 10 and the second container 11 are controlled by a centrifugally actuated valve 37 in such a manner that said valves close automatically at a certain impeller speed.

Figure 7:
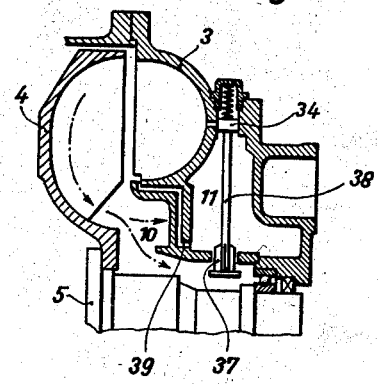
Fig. 7 is a hydraulic coupling in which the inlet and discharge valves of the second container are coupled to each other.

According to Fig. 7, the valves 37 and 34 are rigidly interconnected by rod means 38 so that the valves 37 and 34 will be actuated together. The venting conduit means for the second rotating container are designated with the reference numeral 39.

It is, of course, understood that the present invention is, by no means, limited to the particular constructions shown in the drawings but also comprises any modifications within the scope of the appended claims.

What I claim is:

1. In combination in a hydraulic coupling: a blade-equipped impeller confining a blade chamber, shaft means arranged for driving connection with said impeller, a blade-equipped turbine wheel confining a blade chamber, the inner diameter of the turbine wheel blading being less than that of the impeller blading, said impeller together with said turbine wheel confining the working chamber of said coupling, a first rotatable container located within the inner diameter of said impeller blading and adapted to communicate with the radially inner portion of the blade chamber of said turbine wheel, the axial extension of said first rotatable container being substantially the same as that of the blade chamber of said impeller, and a second rotatable container arranged for rotation with said impeller and adapted to receive a portion of the liquid intended to fill said coupling, said second rotatable container being provided with passage means arranged along about the largest diameter thereof for effecting communication between the blade chamber of said impeller and the interior of said second rotatable container thereby allowing liquid in the working chamber of said coupling during the standstill of said coupling partly to discharge into said second rotatable container and allowing liquid in said second container during the starting period gradually to return into said working chamber through said passage means due to centrifugal force acting upon the liquid in said second container.

2. In combination in a hydraulic coupling: a blade-equipped impeller confining a blade chamber, shaft means arranged for driving connection with said impeller, a blade-equipped turbine wheel confining a blade chamber, the inner diameter of the turbine wheel blading being less than that of the impeller blading, said impeller together with said turbine wheel confining the working chamber of said coupling, a first rotatable container located within the inner diameter of said impeller blading and adapted to communicate with the radially inner portion of the blade chamber of said turbine wheel, a second rotatable container arranged for rotation with said impeller and adapted to receive a portion of the liquid intended to fill said coupling, said second rotatable container being provided with passage means arranged along about the largest diameter thereof for effecting communication between the blade chamber of said impeller and the interior of said second rotatable container thereby allowing liquid in the working chamber of said coupling during the standstill of said coupling partly to discharge into said second rotatable container and allowing liquid in said second container during the starting period gradually to return into said working chamber through said passage means due to centrifugal force acting upon the liquid in said second container, and air exchange channel means arranged between said working chamber of the coupling and the second rotatable container.

3. A hydraulic coupling according to claim 2, in which said air exchange channel means extend from the fluid entrance edge of said impeller blading to about the central portion of said second rotatable container, said air exchange channel means being formed by wall means connected to said impeller.

4. In combination in a hydraulic coupling: a blade-equipped impeller confining a blade chamber, shaft means arranged for driving connection with said impeller, a blade-equipped turbine wheel confining a blade chamber, the inner diameter of the turbine wheel blading being less than that of the impeller blading, said impeller together with said turbine wheel confining the working chamber of said coupling, a first rotatable container located within the inner diameter of said impeller blading and forming one single chamber with the radially inner portion of the blade chamber of said turbine wheel in such a way that the flow of the liquid out of the turbine blade chamber which occurs at high slippage is directed into said first rotatable container, said first rotatable container being so dimensioned as to be capable of receiving the total quantity of the liquid which at high slippage is to be removed from the working chamber for the purpose of reducing the transmitted torque, and a second rotatable container arranged for rotation with said impeller and adapted to receive a portion of the liquid intended to fill said coupling, said second rotatable container being provided with passage means having only small ports arranged along about the largest diameter thereof for effecting communication between the blade chamber of said impeller and the interior of said second rotatable container thereby allowing liquid in the working chamber of said coupling during the standstill of said coupling partly to discharge into said second rotatable container and allowing liquid in said second container during the starting period gradually to return into said working chamber through said passage means due to centrifugal force acting upon the liquid in said second container.

5. In combination in a hydraulic coupling: a blade-equipped impeller confining a blade chamber, shaft means arranged for driving connection with said impeller, a blade-equipped turbine wheel confining a blade chamber, the inner diameter of the turbine wheel blading being less than that of the impeller blading, said impeller together with said turbine wheel confining the working chamber of said coupling, a first rotatable container located within the inner diameter of said impeller blading and forming one single chamber with the radially inner portion of the blade chamber of said turbine wheel in such a way that the flow of the liquid out of the turbine blade chamber which occurs at high slippage is directed into said first rotatable container, said first rotatable container being so dimensioned as to be capable of receiving the total quantity of the liquid which at high slippage is to be removed from the working chamber for the purpose of reducing the transmitted torque, and a second rotatable container arranged for rotation with said impeller, and working liquid within said coupling, said second container being adapted to receive a portion of said liquid and being provided with passage means arranged along about the largest diameter of said second container for effecting communication between the blade chamber of said impeller and the interior of said second container thereby allowing liquid in the working chamber of said coupling during the standstill of said coupling partly to discharge into said second container and allowing liquid in said second container during the starting period gradually to return into said working chamber through said passage means due to centrifugal force acting upon the liquid in said second container, the total quantity of liquid in said coupling taking up a volume equaling substantially twice the volume of the blade chamber of said impeller.

6. A hydraulic coupling according to claim 4, in which the ratio between the smallest and the largest diameter of the blading of said impeller is greater than 0.4.

7. A hydraulic coupling according to claim 4, in which the largest diameter of said second rotatable container nearly equals the medium diameter of the impeller blading.

8. A hydraulic coupling according to claim 4, in which the medium diameter of the impeller blading considerably exceeds the largest diameter of said second rotatable container.

9. In combination in a hydraulic coupling: a blade-equipped impeller confining a blade chamber, shaft means arranged for driving connection with said impeller, a blade-equipped turbine wheel confining a blade chamber, the inner diameter of the turbine wheel blading being less than that of the impeller blading, said impeller together with said turbine wheel confining the working chamber of said coupling, a first rotatable container located within the inner diameter of said impeller blading and forming one single chamber with the radially inner portion of the blade chamber of said turbine wheel in such a way that the flow of the liquid out of the turbine blade chamber which occurs at high slippage is directed into said first rotatable container, said first rotatable container being so dimensioned as to be capable of receiving the total quantity of the liquid which at high slippage is to be removed from the working chamber for the purpose of reducing the transmitted torque, wall means connected to said turbine wheel and arranged to shield said first rotatable container with regard to said impeller, and a second rotatable container arranged for rotation with said impeller and adapted to receive a portion of the liquid intended to fill said coupling, said second rotatable container being provided with passage means having only small ports arranged along about the largest diameter thereof for effecting communication between the blade chamber of said impeller and the interior of said second rotatable container thereby allowing liquid in the working chamber of said coupling during the standstill of said coupling partly to discharge into said second rotatable container and allowing liquid in said second container during the starting period gradually to return into said working chamber through said passage means due to centrifugal force acting upon the liquid in said second container.

10. In combination in a hydraulic coupling: a blade-equipped impeller confining a blade chamber, shaft means arranged for driving connection with said impeller, a blade-equipped turbine wheel confining a blade chamber, the inner diameter of the turbine wheel blading being less than that of the impeller blading, said impeller together with said turbine wheel confining the working chamber of said coupling, a first rotatable container located within the inner diameter of said impeller blading and forming one single chamber with the radially inner portion of the blade chamber of said turbine wheel in such a way that the flow of the liquid out of the turbine blade chamber which occurs at high slippage is directed into said first rotatable container, said first rotatable container being so dimensioned as to be capable of receiving the total quantity of the liquid which at high slippage is to be removed from the working chamber for the purpose of reducing the transmitted torque, auxiliary blade means connected to said turbine wheel and extending into said first rotatable container, and a second rotatable container arranged for rotation with said impeller and adapted to receive a portion of the liquid intended to fill said coupling, said second rotatable container being provided with passage means having only small ports arranged along about the largest diameter thereof for effecting communication between the blade chamber of said impeller and the interior of said second rotatable container thereby allowing liquid in the working chamber of said coupling during the standstill of said coupling partly to discharge into said second rotatable container and allowing liquid in said second container during the starting period gradually to return into said working chamber through said passage means due to centrifugal force acting upon the liquid in said second container.

11. In combination in a hydraulic coupling: a blade-equipped impeller confining a blade chamber, shaft means arranged for driving connection with said impeller, a blade-equipped turbine wheel confining a blade chamber, the inner diameter of the turbine wheel blading being less than that of the impeller blading, said impeller together with said turbine wheel confining the working chamber of said coupling, a first rotatable container located within the inner diameter of said impeller blading and forming one single chamber with the radially inner portion of the blade chamber of said turbine wheel in such a way that the flow of the liquid out of the turbine blade chamber which occurs at high slippage is directed into said first rotatable container, said first rotatable container being so dimensioned as to be capable of receiving the total quantity of the liquid which at high slippage is to be removed from the working chamber for the purpose of reducing the transmitted torque, a second rotatable container arranged for rotation with said impeller and adapted to receive a portion of the liquid intended to fill said coupling, said second rotatable container being provided with passage means having only small ports arranged along about the largest diameter thereof for effecting communication between the blade chamber of said impeller and the interior of said second rotatable container thereby allowing liquid in the working chamber of said coupling during the standstill of said coupling partly to discharge into said second rotatable container and allowing liquid in said second container during the starting period gradually to return into said working chamber through said passage means due to centrifugal force acting upon the liquid in said second container, and valve means associated with said passage means and arranged for controlling the same.

12. A hydraulic coupling according to claim 11, in which said valve means are arranged for control by centrifugal force.

13. An arrangement according to claim 4, which includes: first wall means connected to said turbine wheel and shielding said first rotatable container with regard to said impeller, and second wall means connected to said impeller, said first and second wall means confining air exchange channel means for allowing an exchange of air between the working chamber of said coupling and said second rotatable container.

14. In combination in a hydraulic coupling: a blade-equipped impeller confining a blade chamber, shaft means arranged for driving connection with said impeller, a blade-equipped turbine wheel confining a blade chamber, the inner diameter of the turbine wheel blading being less than that of the impeller blading, said impeller together with said turbine wheel confining the working chamber of said coupling, a first rotatable container located within the inner diameter of said impeller blading and forming one single chamber with the radially inner portion of the blade chamber of said turbine wheel in such a way that the flow of the liquid out of the turbine blade chamber which occurs at high slippage is directed into said first rotatable container, said first rotatable container being so dimensioned as to be capable of receiving the total quantity of the liquid which at high slippage is to be removed from the working chamber for the purpose of reducing the transmitted torque, a second rotatable container arranged for rotation with said impeller and adapted to receive a portion of the liquid intended to fill said coupling, said second rotatable container being provided with passage means having only small ports arranged along about the largest diameter thereof for effecting communication between the blade chamber of said impeller and the interior of said second rotatable container thereby allowing liquid in the working chamber of said coupling during the standstill of said coupling partly to discharge into said second rotatable container and allowing liquid in said second container during the starting period gradually to return into said working chamber through said passage means due to centrifugal force acting upon the liquid in said second container, and additional passage means directly effecting communication between said first and said second rotatable containers.

15. A hydraulic coupling according to claim 14, which includes valve means for controlling said additional passage means.

16. A hydraulic coupling according to claim 14, which includes valve means arranged to be controlled centrifugally and provided for controlling said additional passage means.

17. An arrangement according to claim 4, which includes: additional shaft means rotatably supporting said impeller, and partition means connected to said impeller and extending therefrom in the direction toward said additional shaft means along a plane substantially perpendicular to the axis of rotation of said impeller, said partition means partitioning said first and second rotatable containers from each other, and the inner edge of said partition means confining with said second shaft means an annular passageway for establishing communication between said first and second rotatable containers.

18. An arrangement according to claim 4, which includes: first valve means arranged for controlling said passage means, additional passage means directly effecting communication between said first and said second rotatable containers, second valve means arranged for controlling said additional passage means, and means operatively interconnecting said first and second valve means.

19. In combination in a hydraulic coupling: a blade-equipped impeller confining a blade chamber, a blade-equipped turbine wheel confining a blade chamber, the inner diameter of the turbine wheel blading being less than that of the impeller blading, said impeller together with said turbine wheel confining the working chamber of said coupling, a first rotatable container located within the inner diameter of said impeller blading and forming one single chamber with the radially inner portion of the blade chamber of said turbine wheel in such a way that the flow of the liquid out of the turbine blade chamber which occurs at high slippage is directed into said first rotatable container, said first rotatable container being so dimensioned as to be capable of receiving the total quantity of the liquid which at high slippage is to be removed from the working chamber for the purpose of reducing the transmitted torque, a second rotatable container arranged for rotation with said impeller and adapted to receive a portion of the liquid intended to fill said coupling, said second rotatable container being provided with passage means having only small ports arranged along about the largest diameter thereof for effecting communication between the blade chamber of said impeller and the interior of said second rotatable container thereby allowing liquid in the working chamber of said coupling during the standstill of said coupling partly to discharge into said second rotatable container and allowing liquid in said second container during the starting period gradually to return into said working chamber through said passage means due to centrifugal force acting upon the liquid in said second container, first shaft means, second shaft means, one of said shaft means being arranged for driving connection with said impeller and the other of said shaft means rotatably supporting said impeller, and partition means connected to said impeller and extending therefrom in the direction toward one of said shaft means along a plane substantially perpendicular to the axis of rotation of said impeller, said partition means partitioning said first and second rotatable containers from each other, and the inner edge of said partition means confining with one of said shaft means an annular passageway for establishing communication between said first and second rotatable containers.

20. In combination in a hydraulic coupling: a blade-equipped impeller confining an impeller chamber, shaft means arranged for driving connection with said impeller, a blade-equipped turbine wheel confining a turbine chamber, the inner diameter of the turbine wheel chamber being less than that of the impeller chamber, said impeller chamber and said turbine chamber forming the working chamber of said coupling, a first rotatable container located within the inner diameter of said impeller chamber and forming one single chamber with the radially inner portion of said turbine wheel chamber in such a way that the flow of the liquid out of the turbine chamber which occurs at high slippage is directed into said first rotatable container, said first rotatable container being so dimensioned as to be capable of receiving the total quantity of the liquid which at high slippage is to be removed from said working chamber for the purpose of reducing the transmitted torque, and a second rotatable container arranged for rotation with said impeller and adapted to receive a portion of the liquid intended to fill said coupling, said second rotatable container being provided with passage means having only small ports arranged along about the largest diameter thereof for effecting communication between said impeller chamber and the interior of said second rotatable container thereby allowing liquid in the working chamber of said coupling during the standstill of said coupling partly to discharge into said second rotatable container and allowing liquid in said second container during the starting period gradually to return to said working chamber through said passage means due to centrifugal force acting upon the liquid in said second container.

References Cited in the file of this patent

UNITED STATES PATENTS

| | | |
|---|---|---|
| 2,280,042 | Duffield | Apr. 14, 1942 |
| 2,334,282 | Peterson et al. | Nov. 16, 1943 |
| 2,562,657 | Blank et al. | July 31, 1951 |
| 2,570,768 | Clerk | Oct. 9, 1951 |

FOREIGN PATENTS

| | | |
|---|---|---|
| 801,354 | Germany | Jan. 4, 1951 |
| 883,987 | Germany | July 23, 1953 |